(12) United States Patent
Fleming, III

(10) Patent No.: US 6,249,805 B1
(45) Date of Patent: Jun. 19, 2001

(54) METHOD AND SYSTEM FOR FILTERING UNAUTHORIZED ELECTRONIC MAIL MESSAGES

(75) Inventor: Hoyt A. Fleming, III, Boise, ID (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/909,811

(22) Filed: Aug. 12, 1997

(51) Int. Cl.[7] ........................................ G06F 17/00
(52) U.S. Cl. .................. 709/206; 709/207; 709/238; 709/249; 707/10; 707/104; 364/814
(58) Field of Search ..................... 395/200.36, 200.54, 395/673, 680; 709/206, 249, 207, 238, 104, 10; 364/814

(56) References Cited

U.S. PATENT DOCUMENTS

| | | | |
|---|---|---|---|
| 5,093,918 | * 3/1992 | Heyen et al. | 395/200.54 |
| 5,377,354 | * 12/1994 | Scannell et al. | 395/673 |
| 5,619,648 | * 4/1997 | Canal et al. | 395/200.36 |
| 5,826,022 | * 10/1998 | Neilsen | 709/206 |

OTHER PUBLICATIONS

Barrett, Randy, "ISPs Team Up to Cut Off Spam," May 13, 1997, Inter@active Week, http://www5.zdnet.com/zdnn/content/inwk/0415/inwk0028.html, pp. 1–4.

Quarterman, John S., *The Internet Connection: System Connectivity and Configuration*, 1994, Texas Internet Consulting, U.S.A., Chapter 7.

Seminerio, Maria, "Spam Wars Head to Congress," May 22, 1997, *ZDNN*, http:www5.zdnet.com/zdnn/content/zdnn/0522/zdnn0009.html, pp. 1–2.

Microsoft Corporation, "Excerpts from On–line documentation of Microsoft Exchange," Version 5.0.1458.47, 1986–1997, 11 pp.

Collora et al., *Special Edition—Using Microsoft Exchange Server*, Que Corporation, Indianapolis, IN, 1996, pp. 693–703.

P. Maes "Agent That Reduce Work and Information Overload" Jul. 1994, pp 31–40.*

* cited by examiner

*Primary Examiner*—Dung C. Dinh
*Assistant Examiner*—Hien C. Le
(74) *Attorney, Agent, or Firm*—Dorsey & Whitney LLP

(57) ABSTRACT

A computer system and method for filtering unauthorized electronic mail messages that are sent by senders to a user. The system includes a list of the identifications of the senders who are authorized to send an electronic mail message to the user. When an electronic mail message is received, the system determines whether the sender of the electronic mail message is authorized by determining whether the identification of sender in the electronic mail message is in the list of the identifications of the senders who are authorized. When the sender of the electronic mail message is determined to be authorized, the system stores the electronic mail message in an Inbox folder. When the sender of the electronic mail message is determined to be not authorized, the system stores the electronic mail message in a Junk Mail folder. In this way, the electronic ail messages are automatically stored in the appropriate folder based on whether the sender is authorized so that the user can view the Inbox folder containing the electronic mail messages sent by authorized senders separately from the Junk Mail folder containing the electronic mail messages sent by unauthorized senders.

9 Claims, 3 Drawing Sheets

METHOD AND SYSTEM FOR FILTERING UNAUTHORIZED ELECTRONIC MAIL MESSAGES

TECHNICAL FIELD

This invention relates generally to electronic mail systems and more particularly to the filtering of electronic mail messages.

BACKGROUND OF THE INVENTION

Electronic mail is becoming an increasingly popular form of communications. Electronic mail systems allow one user of a computer system (i.e., a sender) to send a message electronically to another user (i.e., a recipient). To create an electronic mail message, the sender designates the recipient to whom the electronic mail is to be sent and creates the body (e.g., text) of the electronic mail message. The electronic mail system then forwards the electronic mail message to the recipient via a communications mechanism such as a local area network or the Internet. When the recipient receives the electronic mail messages, the recipient can view the body of the electronic mail message.

To ensure format compatibility among various electronic mail systems, the electronic mail messages are formatted in accordance with a conventional format such as defined by the Simple Mail Transfer Protocol ("SMTP"). According to this format, the electronic mail message contains an envelope portion and a body portion. The envelope portion identifies the sender and the recipient, identifies the electronic mail address of the recipient, and may identify the subject of the electronic mail message. The body portion contains the message itself, which is typically in text format. The electronic mail system may need to route an electronic mail message through various computer systems until it reaches the computer system of the recipient. Each of the computer systems through which the electronic mail message is routed use the recipient's electronic mail address to forward the electronic mail message.

Electronic mail systems store electronic mail messages that have been sent or received in a file referred to as the electronic mail file. The electronic mail files are typically organized into various folders and subfolders. The folders allow a user of the electronic mail system to store related electronic mail messages in the same folder in a way that is very similar to how directories allow a user of a file system to store related files in the same directory. When the electronic mail system receives an electronic mail message for a user, the electronic mail system stores the electronic mail message in a folder that is designated as the "Inbox" folder within the user's electronic mail file. The electronic mail system allows the user to view the electronic mail messages that are currently in the Inbox folder. When the user selects to display the contents of the Inbox folder, the electronic mail system displays information from the envelope portion (e.g., sender's name and subject information) for each of the electronic mail messages currently in the folder. Based on the envelope information, the user can select to display the body of an electronic mail message. The electronic mail system also allows the user to move the electronic mail messages from the Inbox folder to other folders or to delete the electronic mail messages. When a user sends an electronic mail message, the electronic mail system typically saves a copy of the electronic mail message in a folder that is designated as the "Sent" folder. The user can move and delete the electronic mail messages stored in any of the folders in the same manner as done for the Inbox folder.

The electronic mail address for a user uniquely identifies the computer system at which the recipient expects to receive the electronic mail messages. Electronic mail addresses can be very complex strings of characters that identify countries, companies, divisions within companies, and individual users. Thus, to provide a more friendly user interface, typical electronic mail systems maintain an address book that contains a mapping of the names of the users to their electronic mail addresses. Thus, when a user wishes to designate a recipient, the user need only indicate the name of the recipient and the electronic mail system uses the address book to retrieve the electronic mail address for that recipient. A user will generally have a personal address book with the names and electronic mail addresses of those recipients to whom the user normally sends electronic mail messages. In addition, the electronic mail systems typically maintain a global address book that is shared by all users of the electronic mail system. For example, the global address book may contain the names and electronic mail addresses of all the employees of a company. An employee may then store the names and electronic mail addresses of non-employee friends in the employee's own personal address book. When the electronic mail system sends an electronic mail message, it searches the global and personal address books for the electronic mail address of the recipient.

Prior to the popularity of the Internet, a user of an electronic mail system generally received electronic mail messages only from known senders. For example, an employee of a company would receive electronic mail messages only from other employees of the company. The electronic mail system may only be connected to computer systems owned by the company. However, with the increasing popularity of the Internet, a user may be able to send electronic mail messages to anyone who is connected to the Internet. The sender of an electronic mail message needs only to know the electronic mail address of the recipient. Thus, users can and often do receive electronic mail messages from unknown senders.

Recently, a problem has developed which seriously impairs the effectiveness of electronic mail systems. Many large promotional companies are turning to the Internet to advertise products of their clients. These promotional companies acquire and maintain lists of electronic mail addresses for thousands of users. When a client wants to advertise a product, the promotional company will send an electronic mail message to each electronic mail address in its list. A user may occasionally receive an unsolicited electronic mail message from such a promotional company. Such occasional receipt of such electronic mail message, while annoying, does not seriously impair the effectiveness of the electronic mail system. However, because of the perceived benefits of advertising via the Internet, a user may now receive so many unsolicited electronic mail messages on a daily basis, that the unsolicited electronic mail messages vastly outnumber the electronic mails messages received from known senders. The process of sending these promotional electronic mail messages indiscriminately to the various electronic mail addresses by the promotional companies is referred to as "spamming." Because a recipient may receive so many unsolicited (i.e., junk) electronic mail messages, it may be very difficult for the recipient to sort through and determine which electronic mail messages are not junk. Such sorting has been a serious impediment to the effectiveness of the electronic mail systems. The seriousness of the problem has been recognized and legislation has even been proposed that would outlaw such spamming practices. In addition, several litigations have been spawned to force such promotional companies to cease their spamming practices.

One potential solution to the problems resulting from the spamming practices has been tried, but unfortunately has been unsuccessful. A service, known as a "de-spamming service," has been provided that attempts to limit the junk mail that is sent. Such a de-spamming service maintains a list of the electronic mail addresses of users who have requested not to receive junk mail. When a promotional company wishes to send an electronic mail message to all the users whose electronic mail addresses are on its mailing list, the promotional company first sends the electronic mail messages to the de-spamming computer system. The de-spamming computer system checks its list of electronic mail addresses and deletes any of the electronic mail messages that are destined to any electronic mail addresses on its list. The de-spamming computer system then forwards the remaining electronic mail messages onto the recipients. Whenever a recipient does not want to be included on a mailing list, the recipient can notify the de-spamming computer system, which will add the recipient's electronic mail address to the list of electronic mail addresses that are not to receive junk mail. Recently, however, such de-spamming services have ceased offering the service because it has proved to be uneconomical.

Certain electronic mail systems also allow a user to designate how to automatically handle a received electronic mail message. For example, a user can indicate that all electronic mail messages received from a certain sender can automatically be stored in a designated folder, be deleted, or be forwarded to another recipient. To provide such routing of electronic mail messages, the user needs to specify a characteristic (e.g., sender=John Smith) of the envelope portion or the body portion so that the electronic mail system can determine which electronic mail systems satisfy the characteristic. However, with such electronic mail systems, a user cannot specify how to automatically handle electronic mail messages if they are unaware of any characteristic of the electronic mail message. In particular, a user may not know in advance the identity of the sender of junk mail and thus cannot have the junk mail automatically deleted.

SUMMARY OF THE INVENTION

Some embodiments of the present invention provide a computer system and method for filtering unauthorized messages that are received by a user. For each message received, the system determines whether the sender of the message is designated as being authorized to send messages to the user. When the sender of the message is determined to be authorized, the system indicates that the message is from an authorized sender. When the sender of the message is determined to be not authorized, the system indicates that the message is from an unauthorized sender. In this way, the recipient (i.e., the user) of the messages can identify whether a message is authorized based solely on the indications. In one embodiment, the messages are electronic mail messages, and the system provides the indications by storing the filtered electronic mail messages in separate folders. The system also maintains a list of authorized senders that it uses when determining whether the sender of the message is designated as being authorized. In another aspect of the present invention, the system automatically adds each recipient of an electronic mail message sent by a user to the list of senders who are authorized to send electronic mail messages to that user.

DETAILED DESCRIPTION OF THE INVENTION

Figure 1:
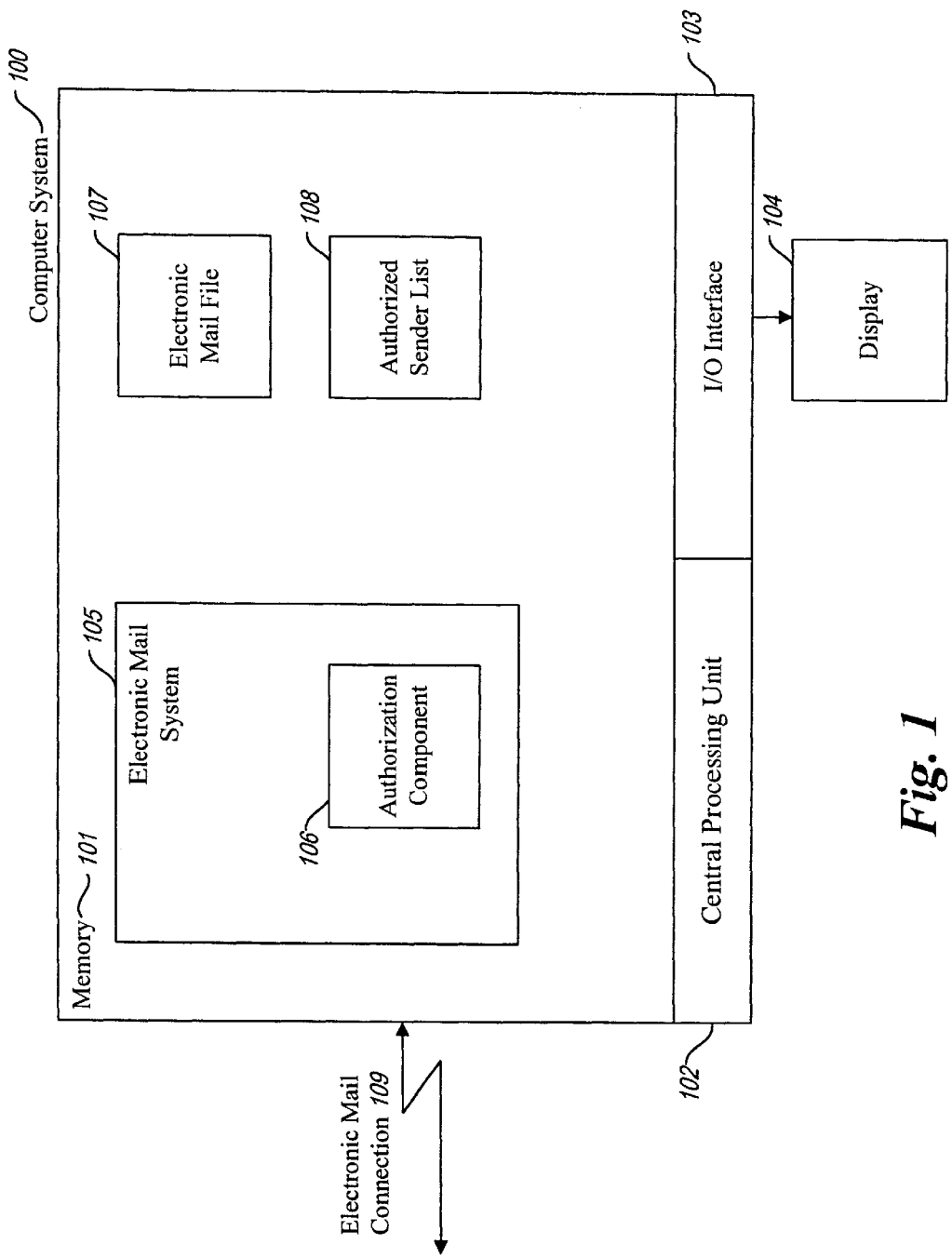
FIG. 1 is a block diagram illustrating a computer system for practicing the present invention.

The present invention provides a method and system for filtering electronic mail messages that are received from unauthorized senders. In one embodiment of the present invention, an authorization component is included with an electronic mail system. The authorization component intercepts electronic mail messages that are sent to a user before they are placed in the user's Inbox folder. The authorization component has the identifications of all senders who are authorized to send electronic mail messages to the user. When an electronic mail message is intercepted, the authorization component retrieves the identification of the sender from the envelope portion of the intercepted electronic mail message. The authorization component then determines whether the retrieved identification of the sender matches the identification of one of the authorized senders. If the retrieve identification does not match, then the authorization component stores the intercepted electronic mail message in a pre-designated location, such as a "Junk Mail" folder. Otherwise, the authorization component forwards the intercepted electronic mail message to the electronic mail system for normal processing and storage. With the use of such an authorization component a user can effectively filter out unauthorized (i.e., junk) electronic mail messages. Periodically, the user can view the Junk Mail folder to delete or read the electronic mail messages that were designated as junk.

The authorization component can store the identifications of the authorized senders in a list that is either manually or automatically updated. A user can manually update the authorized sender list in several circumstances. For example, when an electronic mail message is stored in the Junk Mail folder but the user does not consider the electronic mail message to be junk, the user can add the identification of the sender to the authorized sender list. Conversely, when an electronic mail message is not stored in the Junk Mail folder but the user considers the electronic mail message to be junk, the user can remove the identification of the sender from the authorized sender list. The authorization component can also automatically update the authorized sender list in several circumstances. For example, the authorization component can scan previously sent electronic mail messages and add the identifications of the recipients to the authorized sender list. The authorization component can also scan previously received electronic messages (e.g., in a certain folder) and add the identifications of the senders to the authorized sender list. In addition, the authorization component can automatically add the identification of each recipient to the authorized sender list whenever the user sends an electronic mail message. The authorization component can also allow the user to disable the filtering of electronic mail messages. It may be desirable to disable such filtering, for example, when the authorized sender list has not yet been updated to contain the identification of most of the authorized senders.

The authorization component can be used by an administrator of an electronic mail system of a company to ensure that the employees do not receive unauthorized electronic mail messages. For example, the administrator could maintain a global authorized sender list that is shared by all employees. The authorized sender list could contain only the names of the employees of the company. If the authorization component automatically deleted the electronic mail messages from senders not in the authorized sender list, then the employees would not receive electronic mail messages sent by other employees. Alternatively, the global authorized sender list can serve to relieve each individual employee of maintaining an authorized sender list with the names of all employees. Each employee could also maintain a personal authorized sender list the identifies additional senders (e.g., spouse) who are authorized to send electronic mail messages to the employee. The authorization component would only consider an electronic mail message to be junk when the identification of the sender is not in either the global or the personal authorized sender list. A user may be allowed to specify and de-specify many different authorized sender lists at various times. For example, a user may have an authorized sender list for business acquaintances and another authorized sender list for social acquaintances.

The authorization component can handle the electronic mail message from unauthorized senders in different ways other than automatically storing in a Junk Mail folder or deleting. For example, electronic mail messages received from a sender who is not an employee of a company can automatically be routed to the electronic mail system administrator. Also, all electronic mail messages from unauthorized senders can be automatically forwarded to an assistant of the user who can determine whether the electronic mail message is really junk. If the electronic mail message is not junk, then the assistant can re-send the electronic mail message to the user and update the authorized sender list for the user accordingly. Also, the authorization component can simply store an indication that indicates whether or not an electronic mail message is from an authorized sender. When the electronic mail system displays electronic mail messages, it can display a visual indicator as to whether each electronic mail message is junk based on the stored indication. For example, the visual indication could be the displaying of information relating to the junk electronic mail messages in a dimmer intensity than the non-junk electronic mail messages.

FIG. 1 is a block diagram illustrating a computer system for practicing the present invention. The computer system 100 includes memory 101, central processing unit 102, I/O interface 103, display device 104, and electronic mail connection 109. The memory contains the electronic mail system 105 which includes the authorization component 106 of the present invention. The electronic mail system passes each electronic mail message it receives to the authorization component. The authorization component uses the authorized sender list 108 to determine whether the sender of the electronic mail message is authorized to send the received electronic mail message. If the sender is not authorized, the authorization component stores the received electronic mail message in a designated Junk Mail folder in the electronic mail file 107. The authorization component can operate as an add-on component to any system (e.g., Internet browsers) that supports the receiving of electronic mail messages.

Figure 2:
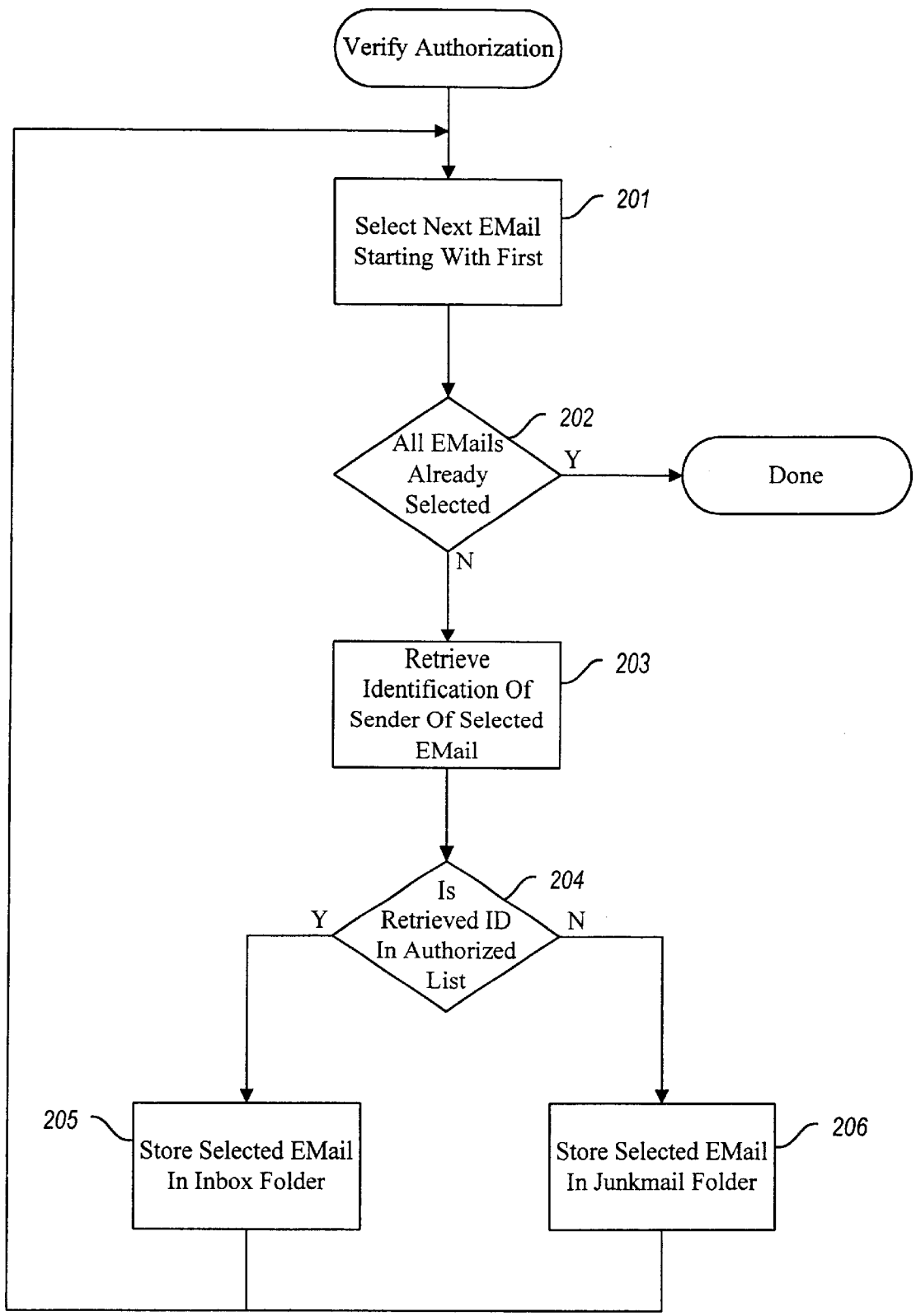
FIG. 2 is a flow diagram of a routine that provides an implementation of the authorizing for the authorization component.

FIG. 2 is a flow diagram of a routine that provides an implementation of the authorizing for the authorization component. This routine receives the authorized sender list and the electronic mail messages. The routine determines whether the identification of the sender of each electronic mail message is in the authorized sender list. If the sender is authorized, then the routine stores the electronic mail message in a designated folder for authorized senders. If the sender is not authorized, then the routine stores the electronic mail message in a Junk Mail folder. In step 201, the routine selects the next electronic mail message starting with the first. In step 202, if all the electronic mail messages have already been selected, then the routine is complete, else the routine continues at step 203. In step 203, the routine retrieves the identification of the sender of the selected electronic mail message. In step 204, if the retrieved identification is in the authorized sender list, then the routine continues at step 205, else the routine continues at step 206. In step 205, the routine stores the selected electronic mail message in the Inbox folder and loops to step 201 to select the next electronic mail message. In step 206, the routine stores the selected electronic mail message in the Junk Mail folder and loops to step 201 to select the next electronic mail message.

Figure 3:
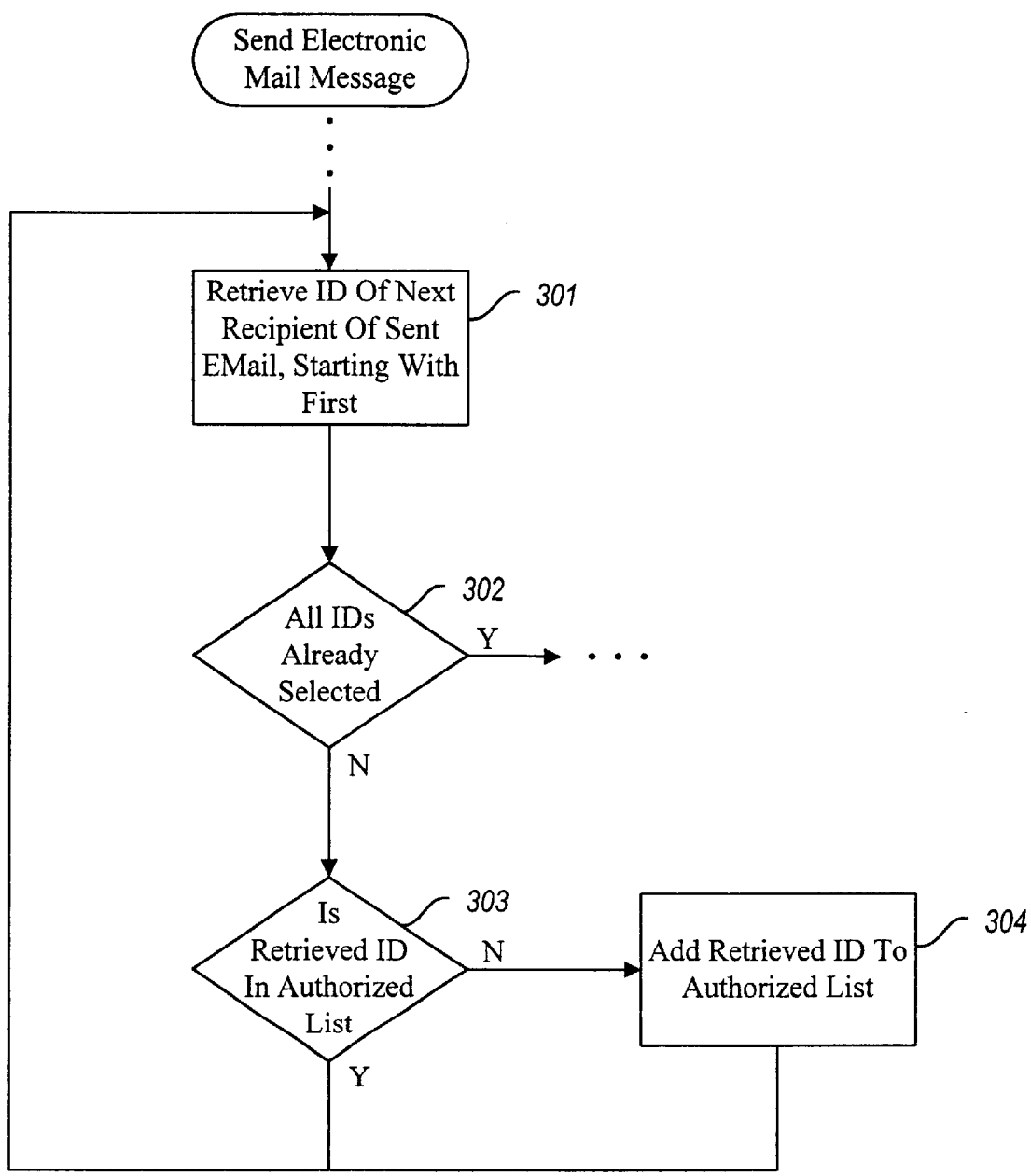
FIG. 3 is a flow diagram of a routine that provides an implementation of the automatic updating of the authorized senders list.

FIG. 3 is a flow diagram of a routine that provides an implementation of the automatic updating of the authorized sender list. This flow diagram shows the portion of the authorization component that adds the recipients of a sent electronic mail message to the authorized sender list for the sender of the electronic mail message. The ellipsis shown in the figure indicates conventional processing to send an electronic mail message. In step 301, the routine retrieves the identification of the next recipient of the electronic mail message to be sent starting with the first. In step 302, if the identifications of all the recipients of the electronic mail message to be sent have already been selected, then the routine continues with the sending of the electronic mail message, else the routine continues at step 303. At step 303, if the retrieved identification is already in the authorized sender list, then the routine loops to step 301 to retrieve the identification of the next recipient, else the routine continues at step 304. In step 304, the routine adds the retrieved identification to the authorized sender list and loops to step 301 to select the next recipient.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for filtering unauthorized received messages, each received message having a sender, the computer system having a default location for storing received messages the method comprising:

for each of a plurality of messages,
determining whether the sender of the message is designated as being either authorized or unauthorized;
storing the message in the default location only of the sender of the message is determined to be authorized;
indicating that the message is from an unauthorized sender by forwarding the message to another user; and
sending a forwarded message back from the other user to the recipient when the message should be viewed by the recipient even though the sender is not authorized.

2. The method of claim 1 wherein the recipient of the messages can identify that a message is authorized based solely on the message being stored in the default location.

3. The method of claim 1 wherein the default location is a message folder.

4. The method of claim 3 wherein the message is an electronic mail message and the default location is an in-box message folder.

5. The method of claim 1 including indicating that the message is from an unauthorized sender by deleting the message.

6. A method in a computer system for filtering unauthorized received messages each of which has a sender, the computer system including a personal list of authorized senders that is personalized to a recipient the method comprising:

automatically generating a list of senders authorized to send messages, the list being shared by multiple recipients of messages; and for each of a plurality of received messages,
determining whether the sender of the message is designated as being authorized by determining whether the sender is in the generated list of authorized senders and determining whether the sender of the message is designated as being unauthorized by determining that the sender is not in either list.

7. The method of claim 6 wherein the list of authorized senders is generated by adding the senders of previously received messages to the list.

8. The method of claim 6 wherein the list of authorized senders is generated by adding the recipients of previously sent messages to the list.

9. The method of claim 6 wherein when the recipient sends a message to an intended recipient, the intended recipient is added to the list as an authorized sender.

* * * * *

UNITED STATES PATENT AND TRADEMARK OFFICE
CERTIFICATE OF CORRECTION

PATENT NO. : 6,249,805 B1  
DATED : June 19, 2001  
INVENTOR(S) : Hoyt A. Fleming III It is certified that error appears in the above-identified patent and that said Letters Patent is hereby corrected as shown below:

Title page,
ABSTRACT, line 15, "ail" should read -- mail --

Column 6,
Line 48, "messages" should read -- messages, --
Line 53, "of" should read -- if --

Signed and Sealed this

Seventh Day of May, 2002

*Attest:*

JAMES E. ROGAN
*Attesting Officer*     *Director of the United States Patent and Trademark Office*